United States Patent
Lazaridis et al.

(10) Patent No.: US 8,976,129 B2
(45) Date of Patent: Mar. 10, 2015

(54) PORTABLE ELECTRONIC DEVICE AND METHOD OF CONTROLLING SAME

(75) Inventors: Mihal Lazaridis, Waterloo (CA); Danny Thomas Dodge, Ottawa (CA); Donald James Lindsay, Mountain View, CA (US)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 62 days.

(21) Appl. No.: 13/243,677

(22) Filed: Sep. 23, 2011

(65) Prior Publication Data

US 2012/0105345 A1   May 3, 2012

Related U.S. Application Data

(60) Provisional application No. 61/386,219, filed on Sep. 24, 2010.

(51) Int. Cl.
*G06F 3/041*  (2006.01)
*G06F 3/0488*  (2013.01)

(52) U.S. Cl.
CPC .......... *G06F 3/04886* (2013.01); *G06F 3/0416* (2013.01); *G06F 3/04883* (2013.01); *G06F 2203/04808* (2013.01)
USPC ........................................................ 345/173

(58) Field of Classification Search
CPC .......................................... G06F 2203/04808
USPC ................................................. 345/173–184
See application file for complete search history.

(56) References Cited

U.S. PATENT DOCUMENTS

| | | | |
|---|---|---|---|
| 5,177,328 A * | 1/1993 | Ito et al. ..................... | 178/18.03 |
| 5,579,036 A * | 11/1996 | Yates, IV ..................... | 345/173 |
| 5,579,487 A | 11/1996 | Meyerson et al. | |
| 5,754,809 A | 5/1998 | Gandre | |
| 5,861,874 A | 1/1999 | Joto | |
| 6,088,024 A * | 7/2000 | Yamagata ..................... | 345/173 |
| 6,437,836 B1 | 8/2002 | Huang et al. | |
| 6,473,069 B1 * | 10/2002 | Gerpheide ..................... | 345/157 |
| 6,819,315 B2 * | 11/2004 | Toepke et al. ................. | 345/173 |
| 6,833,827 B2 * | 12/2004 | Lui et al. ....................... | 345/173 |
| 7,656,393 B2 * | 2/2010 | King et al. .................... | 345/173 |
| 8,184,108 B2 * | 5/2012 | Smits ............................ | 345/175 |
| 8,238,876 B2 | 8/2012 | Teng et al. | |

(Continued)

FOREIGN PATENT DOCUMENTS

| | | | |
|---|---|---|---|
| EP | 2169521 A1 | 3/2010 | |
| EP | 2175359 A2 | 4/2010 | |

(Continued)

OTHER PUBLICATIONS

Android 2.2 User Guide Manual, Google Inc., Aug. 2, 2010, whole document.

(Continued)

*Primary Examiner* — Quan-Zhen Wang
*Assistant Examiner* — Chun-Nan Lin
(74) *Attorney, Agent, or Firm* — Fish & Richardson P.C.

(57) ABSTRACT

A method is provided for an electronic device with a processor and a touch-sensitive display, the touch-sensitive display including a display area and a non-display area. The method includes providing a boundary based on the display area and the non-display area.

3 Claims, 5 Drawing Sheets

(56) References Cited

U.S. PATENT DOCUMENTS

| | | | |
|---|---|---|---|
| 8,291,344 B2 | 10/2012 | Chaudhri | |
| 8,355,698 B2 | 1/2013 | Teng et al. | |
| 8,456,447 B2* | 6/2013 | Newton | 345/175 |
| 8,464,146 B2 | 6/2013 | Kang | |
| 8,477,082 B2 | 7/2013 | Lee et al. | |
| 8,533,844 B2 | 9/2013 | Mahaffey et al. | |
| 2002/0175836 A1* | 11/2002 | Roberts | 341/34 |
| 2004/0260427 A1 | 12/2004 | Wimsatt | |
| 2005/0030291 A1* | 2/2005 | Yanagisawa | 345/173 |
| 2005/0063149 A1 | 3/2005 | Shimamoto et al. | |
| 2005/0088421 A1* | 4/2005 | Toepke et al. | 345/173 |
| 2005/0162406 A1* | 7/2005 | Ono et al. | 345/173 |
| 2005/0289476 A1 | 12/2005 | Tokkonen | |
| 2006/0050061 A1 | 3/2006 | Aiken et al. | |
| 2006/0055685 A1* | 3/2006 | Rimas-Ribikauskas et al. | 345/179 |
| 2006/0111182 A1* | 5/2006 | Nakanishi et al. | 463/36 |
| 2006/0121985 A1* | 6/2006 | Nakanishi et al. | 463/36 |
| 2006/0146055 A1* | 7/2006 | Chow et al. | 345/473 |
| 2006/0238517 A1* | 10/2006 | King et al. | 345/173 |
| 2007/0250787 A1 | 10/2007 | Kawahara et al. | |
| 2007/0262964 A1 | 11/2007 | Zotov et al. | |
| 2008/0001924 A1 | 1/2008 | de los Reyes et al. | |
| 2008/0007175 A1* | 1/2008 | Park | 313/584 |
| 2008/0165141 A1* | 7/2008 | Christie | 345/173 |
| 2008/0222545 A1 | 9/2008 | Lemay et al. | |
| 2008/0238884 A1* | 10/2008 | Harish | 345/174 |
| 2008/0273014 A1 | 11/2008 | Lowles et al. | |
| 2008/0284754 A1* | 11/2008 | Kao et al. | 345/176 |
| 2009/0058820 A1* | 3/2009 | Hinckley | 345/173 |
| 2009/0061837 A1 | 3/2009 | Chaudhri et al. | |
| 2009/0085886 A1 | 4/2009 | Huang et al. | |
| 2009/0093315 A1* | 4/2009 | Matsunaga et al. | 463/43 |
| 2009/0119678 A1* | 5/2009 | Shih et al. | 719/313 |
| 2009/0135214 A1* | 5/2009 | Suzuki | 345/698 |
| 2009/0146970 A1* | 6/2009 | Lowles et al. | 345/173 |
| 2009/0189875 A1* | 7/2009 | Ma | 345/174 |
| 2009/0237362 A1* | 9/2009 | Wu et al. | 345/173 |
| 2009/0278795 A1* | 11/2009 | Hansen et al. | 345/156 |
| 2009/0278806 A1 | 11/2009 | Duarte et al. | |
| 2010/0007675 A1* | 1/2010 | Kang et al. | 345/592 |
| 2010/0073301 A1* | 3/2010 | Yousefpor et al. | 345/173 |
| 2010/0100067 A1 | 4/2010 | Pugliese, III | |
| 2010/0105443 A1 | 4/2010 | Vaisanen | |
| 2010/0107067 A1* | 4/2010 | Vaisanen | 715/702 |
| 2010/0110019 A1* | 5/2010 | Ozias et al. | 345/173 |
| 2010/0137027 A1 | 6/2010 | Kim | |
| 2010/0145629 A1 | 6/2010 | Botich et al. | |
| 2010/0175018 A1* | 7/2010 | Petschnigg et al. | 715/776 |
| 2010/0185989 A1* | 7/2010 | Shiplacoff et al. | 715/856 |
| 2010/0194667 A1 | 8/2010 | Lee et al. | |
| 2010/0199190 A1 | 8/2010 | Cadiz et al. | |
| 2010/0207911 A1* | 8/2010 | Newton | 345/175 |
| 2010/0211872 A1 | 8/2010 | Rolston et al. | |
| 2010/0214218 A1 | 8/2010 | Vaisanen et al. | |
| 2010/0229090 A1 | 9/2010 | Newton et al. | |
| 2010/0231539 A1 | 9/2010 | Cruz-Hernandez et al. | |
| 2010/0245242 A1* | 9/2010 | Wu et al. | 345/157 |
| 2010/0245275 A1* | 9/2010 | Tanaka | 345/173 |
| 2010/0246104 A1* | 9/2010 | Park et al. | 361/679.01 |
| 2010/0269048 A1 | 10/2010 | Pahlavan et al. | |
| 2010/0302172 A1* | 12/2010 | Wilairat | 345/173 |
| 2011/0004888 A1 | 1/2011 | Srinivasan et al. | |
| 2011/0050607 A1 | 3/2011 | Park | |
| 2011/0164065 A1* | 7/2011 | Mate et al. | 345/676 |
| 2011/0205163 A1 | 8/2011 | Hinckley et al. | |
| 2011/0208716 A1* | 8/2011 | Liu et al. | 707/710 |
| 2011/0209099 A1 | 8/2011 | Hinckley et al. | |
| 2012/0021777 A1* | 1/2012 | Lazaridis et al. | 455/456.4 |
| 2012/0056818 A1* | 3/2012 | Shafi et al. | 345/173 |
| 2012/0231881 A1* | 9/2012 | Matsunaga | 463/31 |
| 2013/0082978 A1* | 4/2013 | Horvitz et al. | 345/175 |

FOREIGN PATENT DOCUMENTS

| | | |
|---|---|---|
| KR | 10-2009-0017517 | 2/2009 |
| WO | 2006020304 A2 | 2/2006 |
| WO | WO 2007/133483 A1 | 11/2007 |
| WO | 2009/088672 | 7/2009 |
| WO | 2009/154862 A1 | 12/2009 |

OTHER PUBLICATIONS

Samsung Vibrant, A Galaxy S Phone, Portable Quad-Band Mobile Phone User Manual, Samsung Telecommunications America LLC, 2010, whole document.
International Search Report dated Dec. 22, 2011, for International Application No. PCT/CA2011/050589, pp. 1-9.
International Search Report dated Dec. 16, 2011, for International Application No. PCT/CA2011/001069, pp. 1-8.
International Search Report dated Dec. 5, 2011, for International Application No. PCT/CA2011/050590, pp. 1-8.
International Search Report dated Dec. 21, 2011, for International Application No. PCT/CA2011/001070, pp. 1-24.
Bragdon et al., "Experimental Analysis of Touch-Screen Gesture Designs in Mobile Environments," CHI 2011, May 7-12, 2011 (10 pages).
Roth et al., "Bezel Swipe: Conflict-Free Scrolling and Multiple Selection on Mobile Touch Screen Devices," CHI 2009, Apr. 4-9, 2009 (4 pages).
International Search Report dated Apr. 21, 2012, for International Application No. PCT/US2011/053061, pp. 1-7.
Written Opinion of International Searching Authority dated Apr. 21, 2012, for International Application No. PCT/US2011/053061, pp. 1-13.
Office Action for corresponding U.S. Appl. No. 13/243,613, dated Oct. 8, 2013.
Office Action for corresponding U.S. Appl. No. 13/240,230, dated Sep. 24, 2013.
Office Action corresponding to Japanese Patent Applicaiton No. 2013-510460, dated Jan. 17, 2014.
Office Action dated Mar. 7, 2014, in corresponding U.S. Appl. No. 13/240,250, filed Sep. 22, 2011.
Office Action dated May 22, 2014, issued in U.S. Appl. No. 13/243,749 (13 pages).
Canadian Office Action dated May 28, 2014, issued in Canadian Application No. 2,797,883 (3 pages).
Canadian Office Action dated May 21, 2014, issued in Canadian Application No. 2,797,877 (3 pages).
Canadian Office Action dated May 21, 2014, issued in Canadian Application No. 2,811,253 (2 pages).
Canadian Office Action dated May 27, 2014, issued in Canadian Application No. 2,812,288 (3 pages).
Office Action dated Jun. 17, 2014, issued in U.S. Appl. No. 13/240,230 (21pages).
Korean Office Action dated Jun. 17, 2014, issued in Korean Application No. 10-2013-7010464 (5 pages).
Office Action dated Oct. 6, 2014, issued in U.S. Appl. No. 13/243,749 (12 pages).
Office Action dated Sep. 26, 2014, issued in U.S. Appl. No. 13/240,250 (20 pages).
Japanese Office Action mailed Sep. 5, 2014, issued in Japanese Application No. 2013-510460 (3 pages).
Korean Office Action dated Sep. 11, 2014, issued in Korean Application No. 10-2012-7028450 (4 pages).
Extended European Search Report dated Oct. 15, 2014, issued in European Application No. 11182356.3 (7 pages).

* cited by examiner

PORTABLE ELECTRONIC DEVICE AND METHOD OF CONTROLLING SAME

CROSS-REFERENCE TO RELATED APPLICATIONS

This application claims the benefit of U.S. Provisional Patent Application 61/386,219, filed Sep. 24, 2010, the entire content of which is incorporated herein by reference.

FIELD OF TECHNOLOGY

The present disclosure relates to electronic devices including, but not limited to, portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
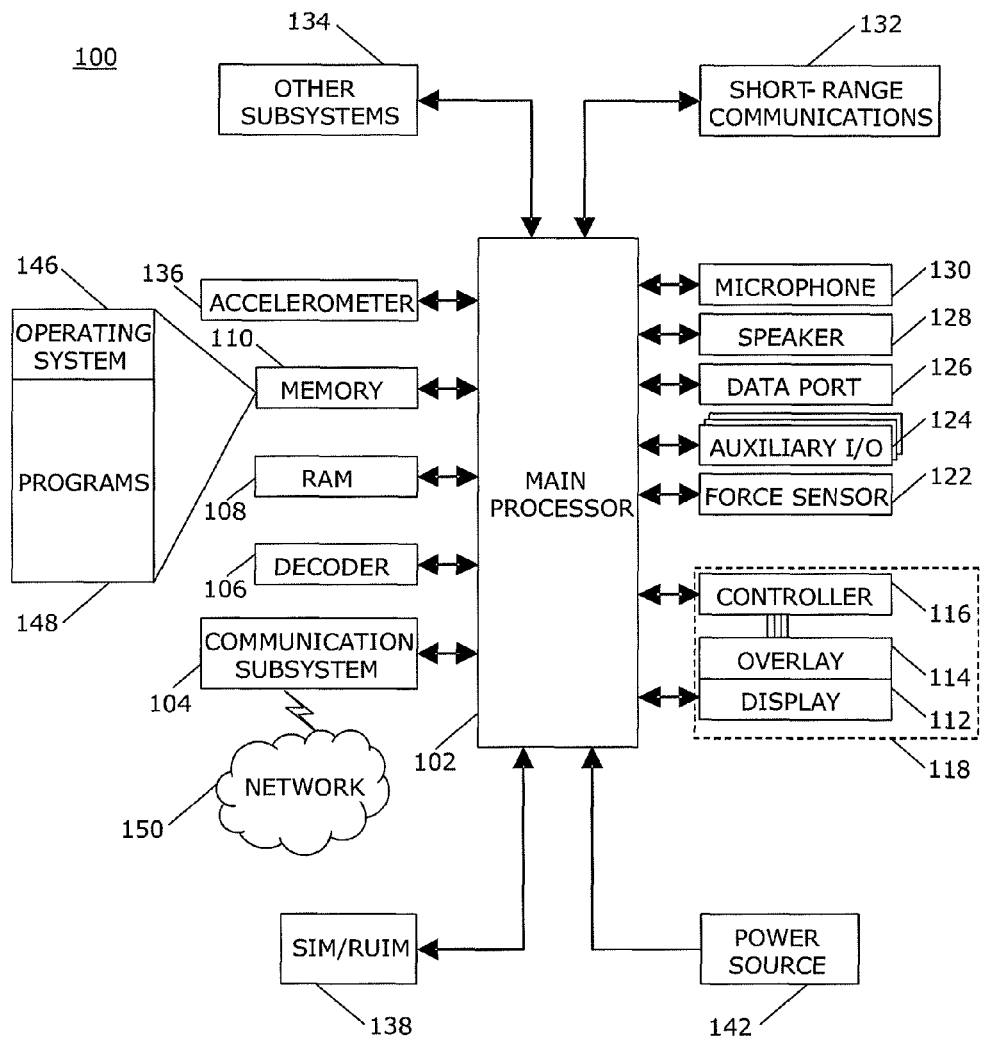
FIG. 1 is a block diagram of a portable electronic device in accordance with an example embodiment.

The following describes an electronic device with a processor and a touch-sensitive display, the touch-sensitive display including a display area and a non-display area. The method includes providing a boundary based on the display area and the non-display area.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device. Examples of portable electronic devices include wireless communication devices such as pagers, mobile or cellular phones, smartphones, wireless organizers, PDAs, notebook computers, netbook computers, tablet computers, and so forth. The portable electronic device may also be a portable electronic device without wireless communication capabilities. Examples include handheld electronic game devices, digital photograph albums, digital cameras, notebook computers, netbook computers, tablet computers, or other devices.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 118 is a capacitive touch-sensitive display which includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact, known as the centroid. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected.

One or more gestures are also detected by the touch-sensitive display 118. A gesture is a particular type of touch on a touch-sensitive display 118 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 114 to initialize the gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the gesture, a horizontal movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation gestures may also be detected by the touch-sensitive overlay 114. A meta-navigation gesture is a gesture that has an origin point that is outside the display area of the touch-sensitive overlay 114 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 114. Thus, two fingers may be utilized for meta-navigation gestures. Further, multi-touch meta-navigation gestures may be distinguished from single touch meta-navigation gestures and may provide additional or further functionality.

In some example embodiments, an optional force sensor 122 or force sensors are disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
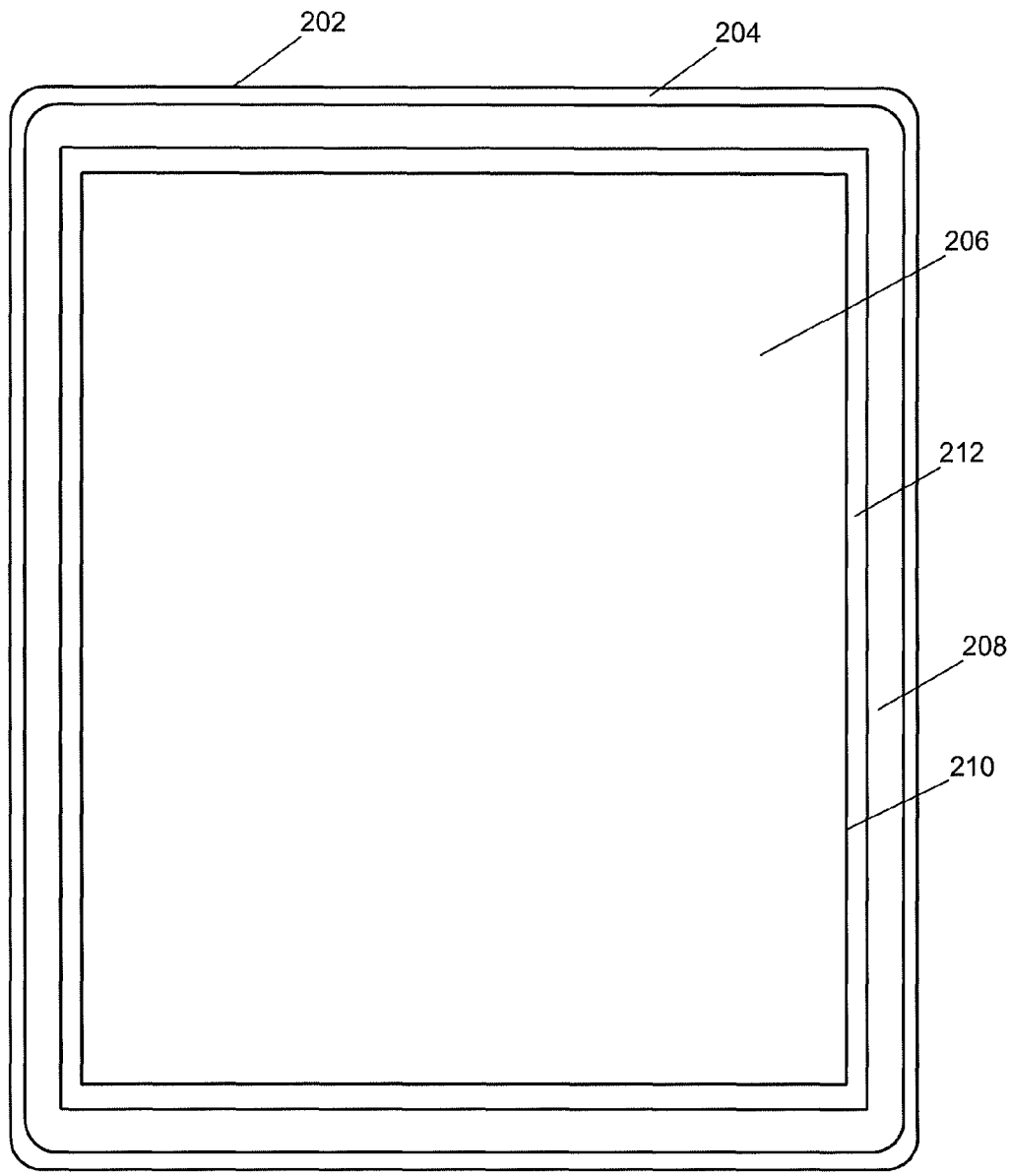
FIG. 2 is a front view of an example of a portable electronic device.

A front view of an example of the portable electronic device 100 is shown in FIG. 2. The portable electronic device 100 includes a housing 202 that encloses components such as shown in FIG. 1. The housing 202 may include a back, sidewalls, and a front 204 that frames the touch-sensitive display 118.

In the shown example of FIG. 2, the touch-sensitive display 118 is generally centered in the housing 202 such that a display area 206 of the touch-sensitive overlay 114 is generally centered with respect to the front 204 of the housing 202. The non-display area 208 of the touch-sensitive overlay 114 extends around the display area 206. In the presently described embodiment, the width of the non-display area 208 is 4 mm.

For the purpose of the present example, the touch-sensitive overlay 114 extends to cover the display area 206 and the non-display area 208. Touches on the display area 206 may be detected and, for example, may be associated with displayed selectable features. Touches on the non-display area 208 may be detected, for example, to detect a meta-navigation gesture. Alternatively, meta-navigation gestures may be determined by both the non-display area 208 and the display area 206. The density of touch sensors may differ from the display area 206 to the non-display area 208. For example, the density of nodes in a mutual capacitive touch-sensitive display, or density of locations at which electrodes of one layer cross over electrodes of another layer, may differ between the display area 206 and the non-display area 208.

Gestures received on the touch-sensitive display 118 may be analyzed based on the attributes to discriminate between meta-navigation gestures and other touches, or non-meta-navigation gestures. Meta-navigation gestures may be identified when the gesture crosses over a boundary near a periphery of the display 112, such as a boundary 210 between the display area 206 and the non-display area 208. In the example of FIG. 2, the origin point of a meta-navigation gesture may be determined utilizing the area of the touch-sensitive overlay 114 that covers the non-display area 208.

A buffer region 212 or band that extends around the boundary 210 between the display area 206 and the non-display area 208 may be utilized such that a meta-navigation gesture is identified when a touch has an origin point outside the boundary 210 and the buffer region 212 and crosses through the buffer region 212 and over the boundary 210 to a point inside the boundary 210. Although illustrated in FIG. 2, the buffer region 212 may not be visible. Instead, the buffer region 212 may be a region around the boundary 210 that extends a width that is equivalent to a predetermined number of pixels, for example. Alternatively, the boundary 210 may extend a predetermined number of touch sensors or may extend a predetermined distance from the display area 206. The boundary 210 may be a touch-sensitive region or may be a region in which touches are not detected.

Gestures that have an origin point in the buffer region 212, for example, may be identified as non-meta-navigation gestures. Optionally, data from such gestures may be utilized by an application as a non-meta-navigation gesture. Alternatively, data from such gestures may be discarded such that touches that have an origin point on the buffer region 212 are not utilized as input at the portable electronic device 100.

Figure 3:
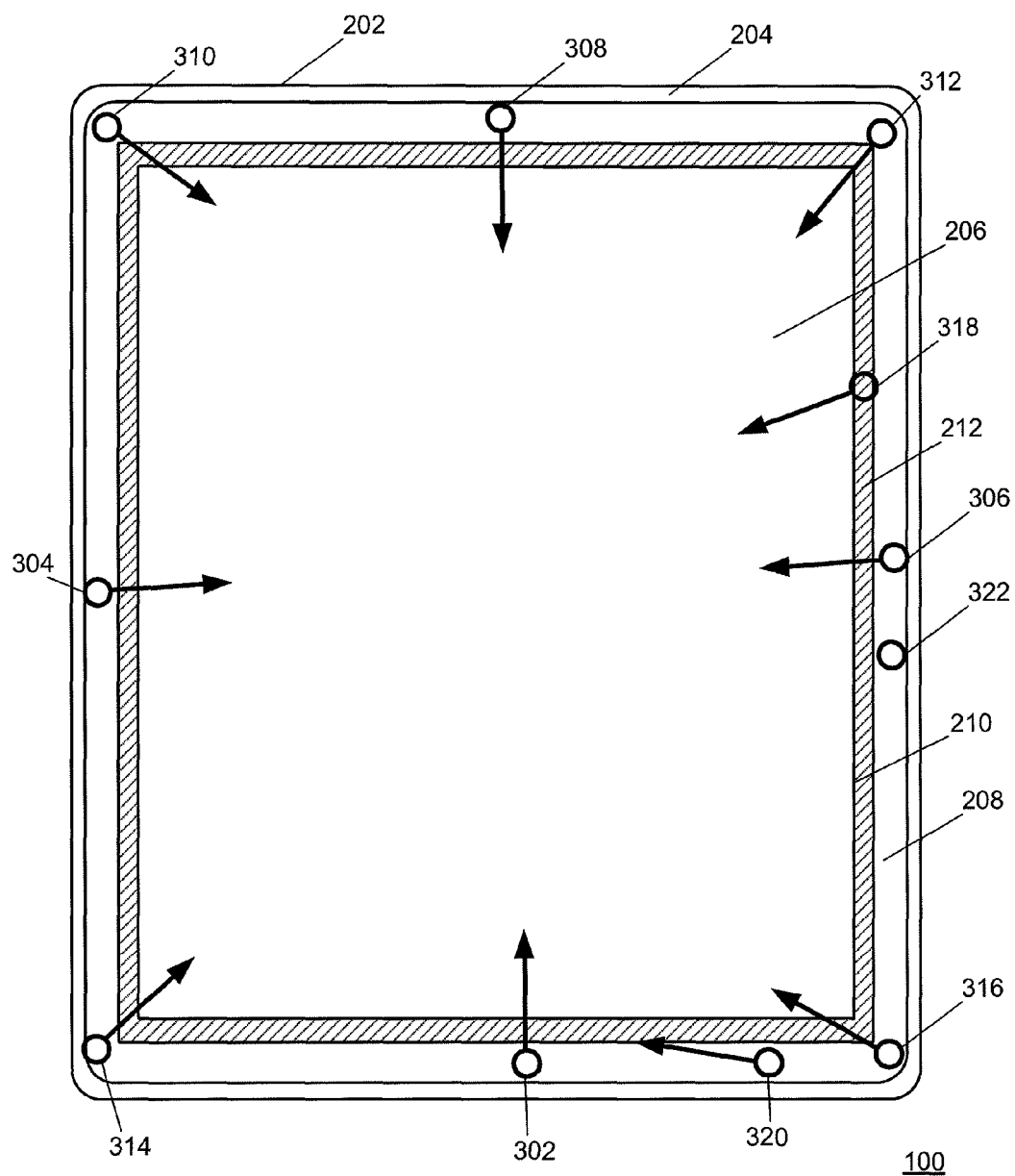
FIG. 3 illustrates examples of touches on the portable electronic device of FIG. 2.

FIG. 3 illustrates examples of touches on the touch-sensitive display 118. The buffer region 212 is illustrated in FIG. 3 by hash markings for the purpose of explanation. As indicated, the buffer region 212 may not be visible to the user. For the purpose of explanation, touches are illustrated by circles at their points of origin. Arrows extending from the circles illustrate the paths of the touches that are gestures.

The touch 302 begins at the origin point outside the boundary 210 and outside the buffer region 212. The path of the touch 302 crosses the buffer region 212 and the boundary 210 and is therefore identified as a meta-navigation gesture. Similarly, the touches 304, 306, 308, 310, 312, 314, 316 each have origin points outside the boundary 210 and the buffer region 212 and their paths cross the buffer region 212 and the boundary 210. Each of the touches 304, 306, 308, 310, 312, 314, 316 is therefore identified as a meta-navigation gesture. The touch 318, however, has an origin point that falls within the buffer region 212 and the touch 318 is therefore not identified as a meta-navigation gesture. The touch 320 begins at an origin point outside the boundary 210 and the buffer region 212. The path of the touch 320, however, does not cross the boundary 210 and is therefore not identified as a meta-navigation gesture. The touch 322 also has an origin point outside the boundary 210 and the buffer region 212 but is not a gesture and therefore does not cross the boundary 210 and is not identified as a meta-navigation gesture.

Figure 4:
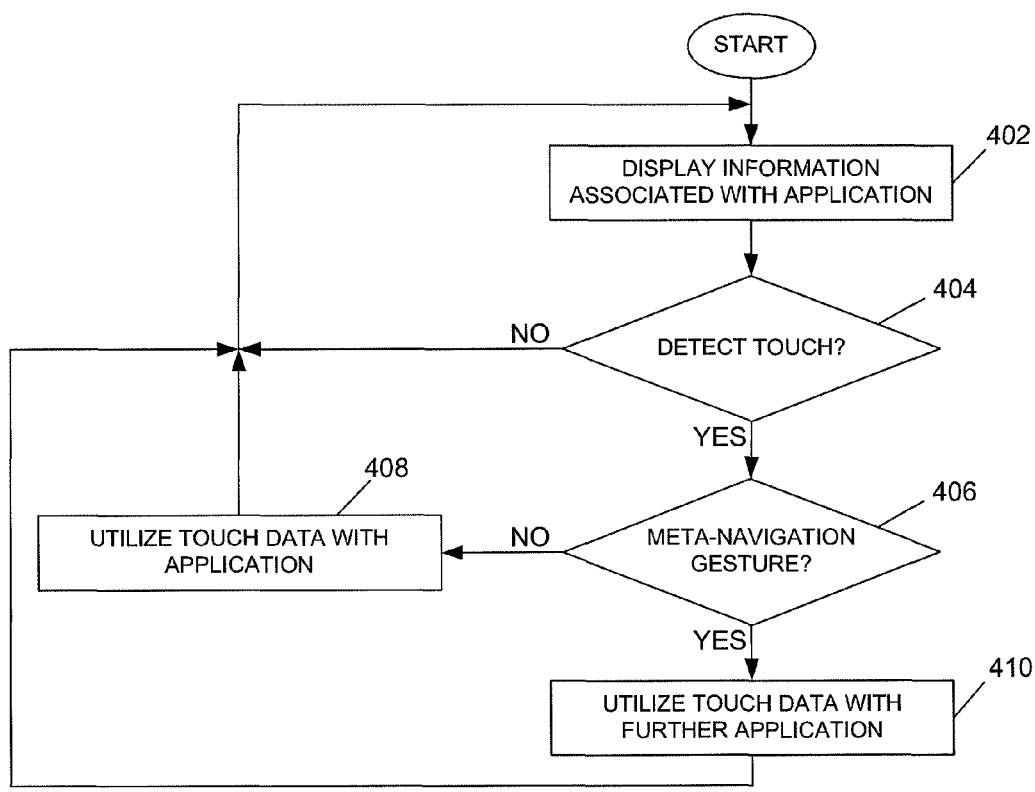
FIG. 4 is a flowchart illustrating a method of controlling the portable electronic device in accordance with the disclosure.

A flowchart illustrating a method of controlling an electronic device, such as the portable electronic device 100, is shown in FIG. 4. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

The process may be carried out in any suitable application, such as, a home screen application, an email application, a text messaging application, a calendar application, a tasks application, an address book application, a web browser application, or any other suitable application. Information from the application, referred to as the first application, is displayed on the touch-sensitive display 118 of the portable electronic device 100 at 402. When a touch is detected at 404, the process continues at 406 and a determination is made whether or not the touch is a meta-navigation gesture. The determination is made based on the attributes of the touch as described above. In response to determining that the touch is not a meta-navigation gesture, which may be a tap on the touch-sensitive display 118 or may be a non-meta-navigation gesture, the touch data is utilized in association with the first application for which information is displayed on the touch-sensitive display 118 at the time the gesture is received, at 408. In response to identifying the touch as a meta-navigation gesture at 406, the touch data is utilized in a second application and information associated with the second, or with a further application, is displayed on the touch-sensitive display 118 at 410. The information associated with the second application may be overlaid on the information associated with the first application, for example, to facilitate navigation back to the information associated with the first application. Alternatively, the information associated with the second application may include, for example, information from a system level navigation interface, a configuration interface, a notification interface, a status interface, a menu interface, or information associated with any other interface.

Figure 5:
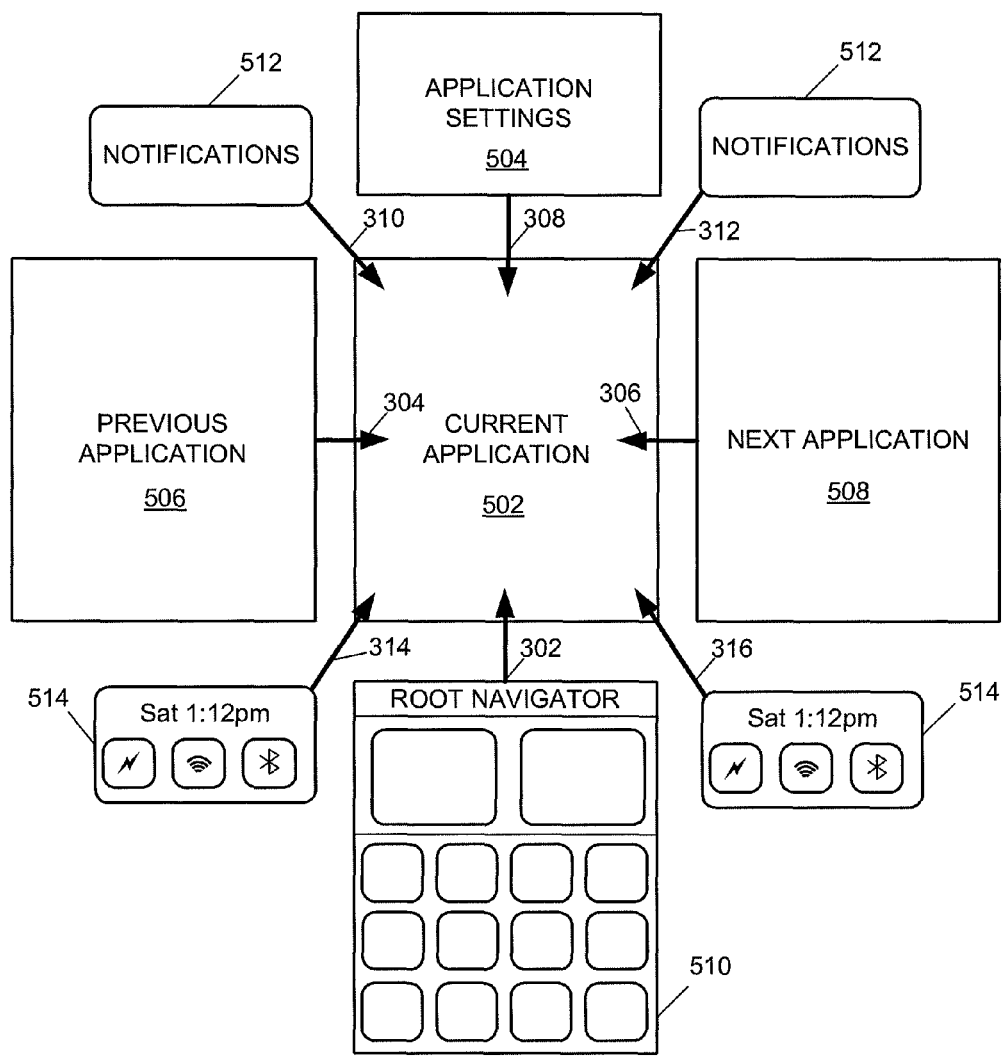
FIG. 5 illustrates examples of associations between meta-navigation gestures and information from applications.

Referring again to FIG. 3, the touches 302, 304, 306, 308, 310, 312, 314, 316 identified as meta-navigation gestures may each be associated with information from an application such that attributes of the meta-navigation gesture such as the origin point, may be utilized to determine which application the meta-navigation gesture is associated with. FIG. 5 illustrates examples of associations between meta-navigation gestures and information from applications, other than the application associated with the information displayed on the touch-sensitive display 118 at the time the gesture is received. The relationships shown in FIG. 5 are shown for illustrative purposes only and are interchangeable. Further applications and alternative associations may be utilized. The terms top, bottom, right, and left are utilized herein for the purpose of providing a reference and refer to an area of the portable electronic device 100 relative to the orientation in which the information associated with the application is displayed.

The meta-navigation gesture 302, which originates near a bottom, center of the touch-sensitive display 118 and follows a generally vertical path in the orientation in which the information from a current application 502 is displayed, causes a homescreen associated with a root-navigation application 510 to replace the information associated with the current application 502. The homescreen includes a carousel showing the currently active applications indicated in a top portion of the display. Accordingly, currently active apps are shown in a browsable carousel in the top portion of the Home Screen. The carousel is located at a top portion of the homescreen. In the present example, the top portion utilizes only about ⅓ of the home screen, and application icons for non-active applications are provided at the bottom portion of the home screen for ease of selection.

The meta-navigation gesture 304, which originates near a left, center of the touch-sensitive display 118 and follows a generally lateral path, causes the information associated with the current application 502 to be replaced with information associated with a previous application 506, which may be a previous application in a grouping or may be an application associated with information previously displayed. The meta-navigation gesture 306, which originates near a right, center of the touch-sensitive display 118 and follows a generally lateral path, causes the information associated with the current application 502 to be replaced with information associated with a next application 508, which may be a next application in a grouping.

The lateral gesture from either the left side or the right side of the touch-sensitive display 118 may cause the information associated with the current application 502 to be reduced in size to provide a visual cue of other active applications prior to replacing the information with the previous application 506 or the next application 508. For example, a portion of the information of the previous application 506 may be displayed in a thin sliver adjacent the edge or edges of the display area 206 during the gesture and prior to replacement of the information associated with the current application 502. The information associated with the current application 502 may be replaced with the previous application 506 or next application 508 as the gesture continues. In an alternative example, a portion of the information of the previous application 506 or a portion of the information for the next application 508 may be displayed in a thin sliver adjacent the edges of the display area 206 in response to a receipt of a first lateral gesture. In this example, a swipe within the thin sliver may cause scrolling of the next and last applications in a list. A second lateral meta-navigation gesture such as the gestures 304, 306 may be utilized to cause the information associated with the current application 502, which information is reduced in size, to be replaced.

The meta-navigation gesture 308, which originates near a top, center of the touch-sensitive display 118 and follows a generally vertical path, causes the information associated with the current application 502 to be replaced with information associated with an applications settings application 504.

The meta-navigation gesture 310, which originates near a top, left corner of the touch-sensitive display 118, causes information associated with a notification application 512 to be tiled over the information associated with the current application 502. Similarly, the meta-navigation gesture 312, which originates near a top, right corner of the touch-sensitive display 118, causes information associated with the notification application 512 to be tiled over the information associated with the current application 502.

The meta-navigation gesture 314, which originates near a bottom, left corner of the touch-sensitive display 118, causes information associated with a status application 514 to be tiled over the information associated with the current application 502. Similarly, the meta-navigation gesture 316, which originates near a bottom, right corner of the touch-sensitive display 118, causes information associated with the status application 514 to be tiled over the information associated with the current application 502.

The present disclosure is not limited to identifying meta-navigation gestures utilizing a touch-sensitive overlay that extends over the non-display area. Meta-navigation gestures may be detected based on, for example, the first detected touch location at a margin of the touch-sensitive overlay, which may be at a margin of the displayable area, and, optionally, based on the gesture speed or direction when the touch is detected or path traversed by the gesture. Identification of meta-navigation gestures may also be carried out utilizing a heuristic algorithm based on touch attributes and responsive to touch attributes such as one or more of the origin point, speed, direction, distance and path of the gesture.

Optionally, the electronic device may include a touch-sensitive frame of the housing or a touch-sensitive bezel circumscribing the touch-sensitive overlay. Meta-navigation gestures may be identified based on an origin point detected on the touch-sensitive frame or bezel.

Further, the boundary that is crossed by a meta-navigation gesture is not limited to the boundary between the display area and the non-display area of the touch-sensitive display. Other suitable boundaries may be utilized and may include a region or band along a margin of the touch-sensitive overlay, a predetermined line, or lines on the touch-sensitive display 118, or the boundary where the bezel or frame of the electronic device meets the touch-sensitive display.

Thus, identification of meta-navigation gestures is not limited to electronic devices with touch-sensitive displays that include a touch-sensitive overlay that covers the non-display area of the display. Identification of meta-navigation gestures may be carried out utilizing other electronic devices.

The use of meta-navigation gestures and the identification of such gestures provide additional input that may be distinguished from non-meta-navigation gestures or other touches. These meta-navigation gestures facilitate entry of input related to an application for which information is not displayed at the time the gesture is received. Thus, input may be received relating to an application that is not associated with information displayed on the touch-sensitive display without the use of icons or selectable features displayed on the touch-sensitive display and without the need to use other controls on the electronic device such as physical buttons or switches. An area or areas of the touch-sensitive display are not taken up to display such icons or selectable features. System level navigation is therefore provided without the use of additional screens or menus for such navigation, providing an improved interface.

According to one aspect, a method is provided for an electronic device with a processor and a touch-sensitive display, the touch-sensitive display including a display area and a non-display area. The method includes providing a boundary based on the display area and the non-display area.

According to another aspect, an electronic device includes a touch-sensitive display, memory, and a processor coupled to the touch-sensitive display and the memory to carry out the above method.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method for an electronic device with a processor and a touch-sensitive display, the touch-sensitive display comprising a display area and a non-display area, the method comprising:
    providing a boundary between the display area and the non-display area, wherein providing comprises providing a width of the boundary, and the width of the boundary corresponds to a predetermined number of pixels;
    displaying first information associated with a first application on the touch-sensitive display;
    detecting a gesture and determining that the gesture has an origin in the non-display area and crosses the boundary between the display area and the non-display area;
    in response to determining that the gesture crosses the boundary, identifying the gesture as a meta-navigation gesture; and
    replacing the first information with second information associated with a second application by displaying the second information on the touch-sensitive display.

2. An electronic device comprising:
    a display including a display area and a non-display area;
    a touch-sensitive overlay extending over the display area and the non-display area;
    a processor coupled to the display and the touch-sensitive overlay, wherein the processor is configured to:
        provide a boundary between the display area and the non-display area, display first information associated with a first application on the touch-sensitive display, wherein the boundary includes a width, and the width of the boundary corresponds to a predetermined number of pixels,
        detect a gesture and determine that the gesture has an origin in the non-display area and crosses the boundary between the display area and the non-display area,
        in response to determining that the gesture crosses the boundary, identify the gesture as a meta-navigation gesture, and
        replace the first information with second information associated with a second application by displaying the second information on the touch-sensitive display.

3. A non-transitory computer-readable medium having computer-readable code executable by at least one processor of an electronic device to perform the method of claim 1.

* * * * *